N. Moor,
Making Staves,
№ 789, Patented June 19, 1838.

Sheet 1-2 Sheets

N. Moor,
Making Staves,
N° 789.   Patented June 19, 1838.
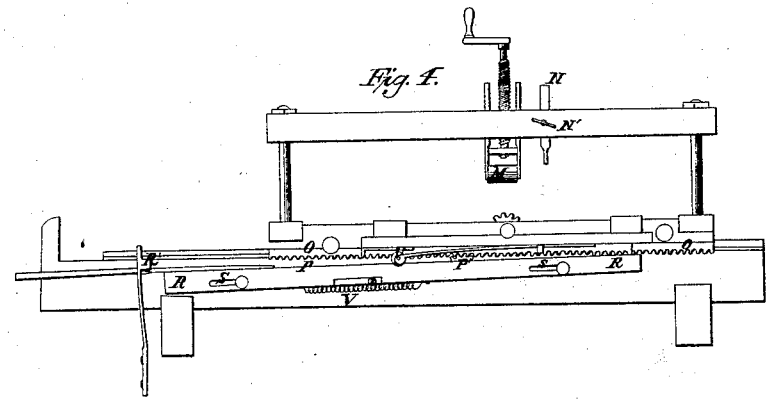
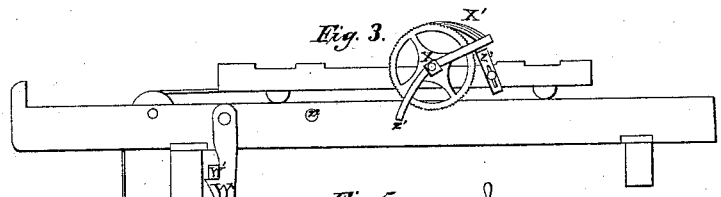
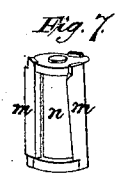
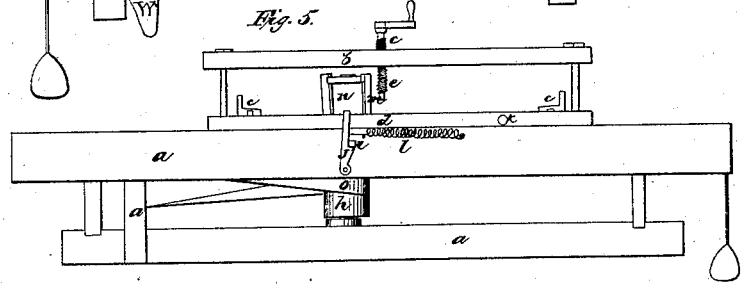
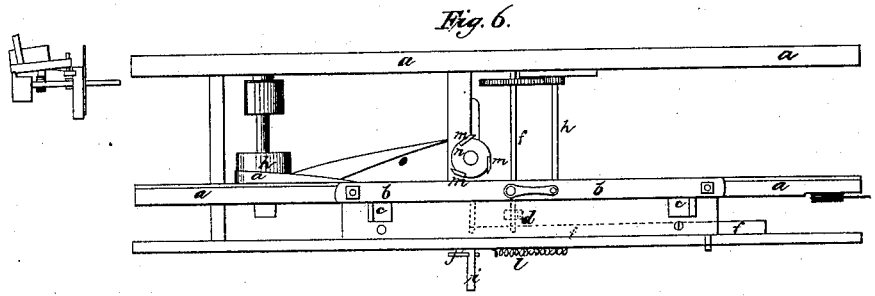

UNITED STATES PATENT OFFICE.

NATHANIEL MOORE, OF ELLSWORTH, MAINE.

MACHINE FOR SAWING AND JOINTING STAVES.

Specification of Letters Patent No. 789, dated June 19, 1838.

*To all whom it may concern:*

Be it known that I, NATHANIEL MOORE, of Ellsworth, in the county of Hancock, in the State of Maine, have invented several Improvements in Machinery for Sawing and Jointing Bilging-Staves; and I do hereby declare that the following is a full and exact description thereof.

The kind of saw which I use is that which is denominated the concavo convex saw, by the employment of which the staves are sawed curvilinearly both lengthwise and crosswise. To the invention, and employment of this saw, for the cutting of staves, I make no claim, it having been long known and used. This kind of saw is described in the *Transactions of the Society of Arts* in Great Britain, which society awarded a medal to its inventor in the year 1805, and the same has been described in other works of science, as in the 10th volume of the *Repertory of Arts*, second series, published in the year 1807. My claims to invention rest therefore upon the construction and arrangement of the machinery of which this saw makes a component part.

Figure 1 is a representation, in perspective, of that part of the machine by which the sawing is effected, the convex sides of the saw being presented to view, and marked A. B, B, B, is the carriage upon which the stuff is sustained, and which is furnished with a self feeding apparatus to be presently described. C is the drum, or whirl, upon the shaft which sustains the saw, and which is represented as driven by a band, which is preferable to cog gearing. From a whirl on this shaft a band is carried to the whirl D, on the shaft of which there is a pinion E, gearing into the wheel F, the shaft of which wheel carries a pinion which gears into a rack on the underside of the carriage; this pinion is shown at G, in Fig. 2, which is a top view of the ways upon which the carriage runs, and of some appendages thereto.

Fig. 3 is a view of the back of the machine or of the side opposite to that shown in Fig. 1.

Fig. 4 is a vertical section along the machine, in the direction of the line H, H, Fig. 2.

Where the same parts are represented in the respective figures, they are designated by the same letters of reference.

Figure 1:
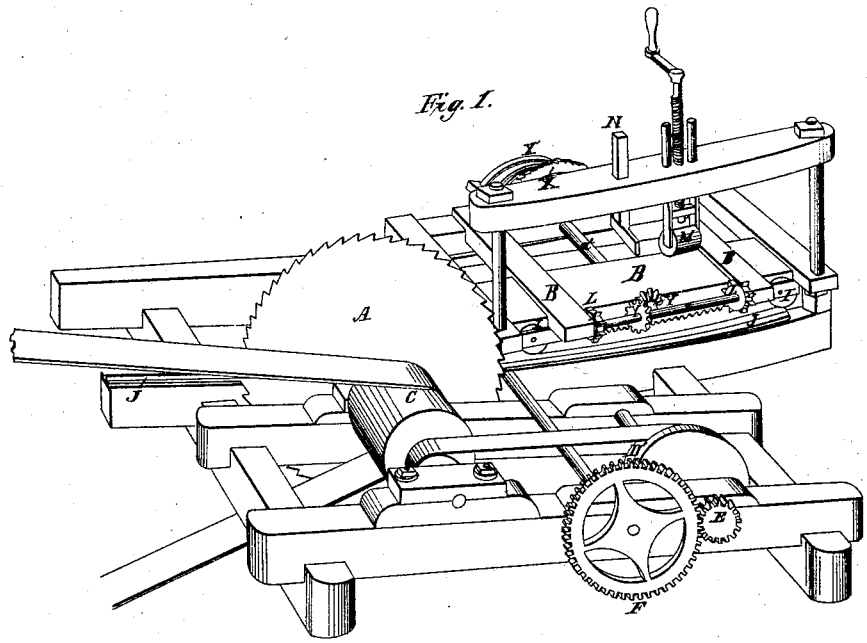

The front wheels, I, I, of the carriage are grooved, and run upon an edge rail, J, J, by which they are guided in the proper curve adapted to the saw. The stuff to be sewed is placed upon the top of the carriage B, B, B, and rests in part upon the teeth of the feeding wheels L, L, which are sharp, and rise a little above the top of the carriage, so as to bite into the stuff, and move it forward. The stuff, which is of sawed plank, cut into suitable lengths, is held down upon the carriage, by the roller M, governed by a screw as shown in the drawing. I also provide a sliding piece N, or two such if preferred, which may be brought down so as to press lightly upon the stuff, in aid of the roller; this sliding piece may be held in its place by a tightening screw N, seen in Fig. 4.

The carriage is made to advance by the gearing of the pinion G, into a rack O, Fig. 4, on the under side of the carriage. The pinion G, is thrown out of gear when the cut is completed, and the carriage is then drawn back by means of a weight passing over a pulley.

Figure 2:
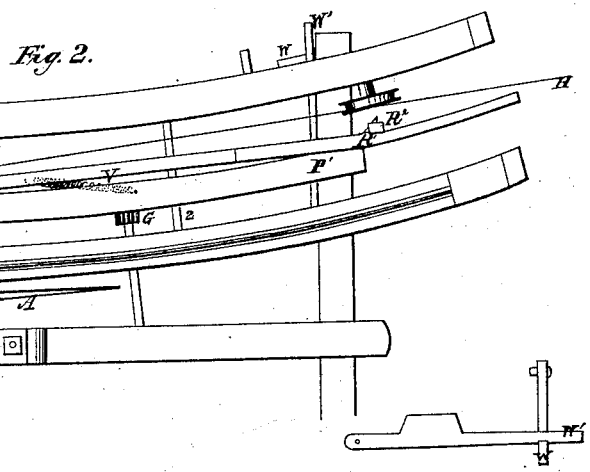

The method of throwing the pinion out of gear is as follows: P, P', Fig. 2, is a piece of timber called a tilting beam, in the side of which the pivot of the pinion G, has its bearing. Q, is a round shaft which runs through this piece of timber, and on which it can turn; the end P', of this piece of timber rests upon the frame of the machine, and it will be seen that if the end P, is depressed, the pinion G, will also be carried down, and thrown out of gear, with the rack. R, R', is also a piece of wood or metal alongside of, and on the same plane with the piece P, P, and like it having the shaft Q, passing through, not however through a round hole; but through a slot, or mortise, as it is necessary that it should have a motion endwise. It is attached to P, P', by two screws passing through slots or mortises, which are shown at S, S, in Fig. 4. At R², Fig. 2, there is a spring catch which holds on to a corresponding catch, or jog seen on the piece R, R', and it is manifest that if R, R', be released from the catch, it and the piece P, P', will be free to turn together on the shaft Q. When the carriage is advanced upon the ways so far as to separate the stave, a pin on its under side comes into contact with the piece T, which rises above R, R', and this bar is consequently drawn back, and relieved from the catch at R'. This catch and the spring which makes a part of it, is shown in R², Fig. 4. A roller U, attached to the end of a spring under the carriage, bears upon the tilting beam P, P. As the carriage runs backward and forward, and causes it to tilt when R, R', is relieved from the catch, throwing G out of gear, and allowing the weight to draw the carriage back. When it arrives back, the catch at R' is struck by it and recedes, and the friction wheel U, now pressing upon the end P' of the tilting, that end is depressed, and the pinion G, Fig. 2, thrown into gear. A spiral spring V, serves to draw the piece R, R', into place against the catch at R².

It is sometimes desirable to allow the wheel work and bands of the machine to run, without allowing the rack and pinion of the carriage to pass into gear, and to effect this, all that is necessary is to hold up the ends $k'$, and $p'$ of the tilting pieces; to effect this a catch or hook W, Figs. 2 and 3, is made to catch under a lever below these pieces, the end W', of this lever is shown as held up by the hook W.

An important part of this machine is the setting apparatus by means of which the planks, as a stave is cut off, is made to advance to the proper distance for another cut. X, Figs. 1, and 3, is a rag wheel and pawls, X'; the rag wheel being fixed on the shaft X², which also carries the bevel pinion Y, gearing into Y', on the shaft Z. The back view of the machine, Fig. 3, will at once show the remainder of the arrangement for setting. The tail piece Z', being brought into contact with the pin, Z², at the proper moment, causes the pawls to advance the rag wheel, and to set the log, which will be carried forward under the pressing roller M, by the feeding wheels L, L. The amount of feed may be regulated by raising or lowering stop piece Z³.

The jointing, or edging apparatus, which I am now about to describe, I usually attach to the sawing apparatus and drive by a band from the wheel D', on the pinion shaft of Fig. 1. It may however be operated in any other manner which may be preferred.

Fig. 5, is a side, and Fig. 6, a top view of the machine, a, a, a, being the frame of the stationary part, and b, b b, the frame of the carriage upon which the staves to be jointed are laid and held. The ends rest upon the cleats c, c, the middle of the bulge bearing upon the bed of the carriage d, being held in place by the screw e, passing through the upper part of the carriage frame b b.

The carriage is moved by a rack and pinion, resembling those of the sawing machine, but the rack and ways are straight. The bilge of the stave, and the cant given to it, by the cleats c, c, and the bed piece d, being such as to place it in a proper position for jointing the edge, while it is carried forward in a straight line. The pinion which gears into the rack, is upon the shaft f, (and represented by dotted lines,) of the cog wheel g, which is driven by a pinion and whirl which is on the shaft h. The inner end of the shaft f, has its bearing in a lever, or strip f' f' which is raised and lowered in a manner similar to that by which the pinion in the sawing machine is thrown out of gear; the piece i, raising or lowering it as may be required. It is represented as in gear, being held up by the catch j, which is thrown back by the pin k, coming into contact with it, when the pinion falls, and the carriage is drawn back, by a weight passing over a pulley, as in the saw carriage. The staves which have been jointed are then removed, and others substituted, when the pinion is again thrown into gear, by hand, the spring l, drawing the catch j, into place, when i, is raised up, several staves, placed on each other, are jointed together. The jointing is effected by revolving knives, or cutters, m, m, Figs. 5, 6, and 7, set around a vertical drum n, n, which is made to revolve with great speed. The knives or cutters must be of such length as is required for the thickness of the number of staves which are to be jointed together. The cutters I drive by a band o, on whirls p, p.

What I claim as constituting my invention, and which I desire to secure by Letters Patent is—

1. The particular manner in which I have arranged and combined the several parts of the machine above described, that is to say I claim the general arrangement of the apparatus by which the rack and pinion of the saw carriage is thrown into and out of gear, as above specifically set forth.

2. I claim also, in their combination with each other, the arrangement of the apparatus for setting the stuff to be sawed, although I do not claim either of the individual parts of this apparatus, taken separately, and alone.

3. In the jointing apparatus I claim the manner of jointing with the knives or cutters, constructed as above described, and combined with the other parts described, for the purpose of jointing staves cut by a concavo-convex or dishing saw.

NATHANIEL MOORE.

Witnesses:
 MIGHILL NUTTING,
 LINTON THORN.